United States Patent [19]

Evans et al.

[11] Patent Number: 4,656,651
[45] Date of Patent: Apr. 7, 1987

[54] SYSTEM FOR PROVIDING REMOTE SERVICES

[75] Inventors: David S. Evans, Newtown; Mark G. Smith, Naugatuck; Francisco A. Middleton; Franklin Hargrave, both of Newtown, all of Conn.

[73] Assignee: ITT Corporation, New York, N.Y.

[21] Appl. No.: 774,113

[22] Filed: Sep. 9, 1985

[51] Int. Cl.⁴ .............................................. H04M 1/24
[52] U.S. Cl. ........................................ 379/1; 379/102; 379/22
[58] Field of Search ................ 179/175.2 C, 2 A, 5 P, 179/175, 175.1 R, 175.11, 175.2 R, 175.3 R, 175.21, 175.23; 370/14; 375/10; 381/110, 36, 43, 58

[56] References Cited
U.S. PATENT DOCUMENTS
4,393,277 7/1983 Besen et al. ...................... 179/2 A Primary Examiner—Stafford D. Schreyer
Attorney, Agent, or Firm—P. C. van der Sluys; R. A. Hays

[57] ABSTRACT

A system for providing remote services and maintenance functions includes a voice subsystem adapted to receive voice and DTMF signals that can be used to control the execution of a plurality of service and maintenance tests. The system also includes a programmed control subsystem that provides voice based response and conveyance of results of such maintenance services and tests to field personnel.

16 Claims, 9 Drawing Figures

FIELD REQUEST SCENARIO - PART 1

FIG. 3

FIG. 4 — FIELD REQUEST SCENARIO - PART 2

FIG. 5

FIELD REQUEST SCENARIO – PART 3

"REQUEST AND CHECK INPUT" SEQUENCE

FIG. 6

FIG. 8 — CALL-BACK SCENARIO — PART I

SYSTEM FOR PROVIDING REMOTE SERVICES

BACKGROUND OF THE INVENTION

The present invention generally relates to a system for providing remote services and, in particular, relates to such a system having a voice based interface to enable field service personnel to utilize conventional handsets and either voice or tone signaling to request maintenance related functions and services and to hear spoken results via the same handset.

The increased complexity of telephone networks as well as data communication networks has increased the use of centralized service centers adapted to perform test and maintenance functions on the communication lines associated with a particular system. One factor militating for such a centralized service center is that the equipment necessary to perform the maintenance and service functions is rather expensive and complex. Hence, by centralizing the service center, the number of skilled personnel needed to operate this equipment and the expense of purchasing the equipment is minimized. In addition, because many of these services are automated, complex and under computer control, the productivity of the service personnel is increased. Further, the centralization of equipment allows the integration of maintenance functions and system service and administrative data bases.

However, in conventional service and maintenance systems, the service personnel in the field lack direct access to the remote maintenance systems. The field service personnel, therefore, must either perform local measurements using tools and instruments that are portable or they may use special dial numbers to access the system maintenance services. Typically, for example, a special dial number is used for a dial-back telephone call to test and ensure call completion on a newly installed or suspect line. However, for the more complex services, the field service personnel presently request the service center personnel to perform the tests and report back to the field service personnel so that corrective action may be taken, if necessary.

These field service procedures are rapidly becoming inadequate due to the increasing complexity and diversity of the equipment being connected to the communication networks. In fact, even for functions that can be performed locally, the tools, instruments and training are frequently quite complex and expensive and thus are prohibitivly difficult to provide to all field service personnel. For example, typical field service personnel are used, primarily, to install voice communication devices. But, with the increased proliferation of data communication devices, for example, often lacking human/machine interface, such as a remote metering transponder located at a subscriber premises, testing thereof cannot be performed without a specialized test unit, that at the present time, the installer first must learn how to use and then has to carry with him. Further, the conventional functions available using existing specially dialed telephone numbers are rather limited in scope and currently difficult to extend. For example, either requesting the service center personnel to perform a test or performing a call back covers the majority of uses available via the specially dialed numbers.

At the present time, remotely run maintenance functions that are available either require each field personnel to carry a terminal and acquire considerable training or, alternatively, require additional service center staff. Adding additional staff, however, negates many of the advantages of centralization of the service center.

Consequently, it is readily apparent that it is difficult to exploit the potential of remote centralized service facilities with conventional systems and that a system maximizing that potential is needed in order to take advantage of the primary aspects of a centralized service center.

SUMMARY OF THE INVENTION

Accordingly, it is one object of the present invention to provide a system for providing remote services without requiring complex equipment or extensive training for the field personnel requesting those services.

This object is accomplished, at least in part, by a system having a means for selecting a particular one of a plurality of services available, the selection being made by an input signal from a requestor in the field via, for example, a subscriber line and including means for automatically vocally conveying the results of the selected service to the requestor via the same subscriber line.

Other objects and advantages will become apparent to those skilled in the art from the following detailed description read in conjunction with the appended claims and drawings attached hereto.

DETAILED DESCRIPTION OF THE INVENTION

Figure 1:
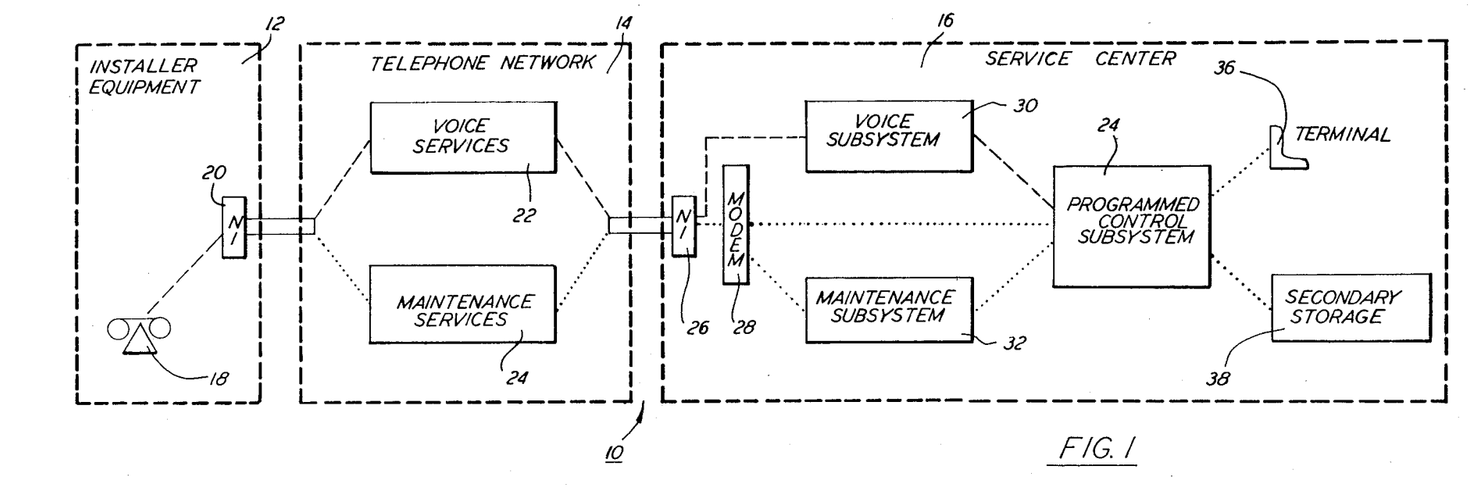
FIG. 1 is a block diagram of a system embodying the principles of the present invention.

A system for providing remote services, generally indicated at 10 in FIG. 1 and embodying the principles of the present invention, includes means 12 for initiating the establishment of a communication channel, a telecommunication network 14 and a service center 16, the service center 16 being remote from the means 12 for establishing a communication channel. The communication channel being established via the telecommunication network 14. In the embodiment described hereinafter the telecommunication network 14 is, preferably, a telephone network, although the present system can be implemented with any form of telecommunication network.

The means 12, in one embodiment includes a telephone subset 18 connected to a telecommunication network interface 20. Preferably, the telephone subset 18 is capable of transmitting voice as well as generating dual tone multifrequency (DTMF) signals via push buttons. The location of the telephone subset 18, although most frequently a subscriber premise, can be any location where tests or maintenance must be performed or requested by field personnel.

In general, the telephone subset 18 will be a typical subscriber subset installed at a subscriber premise. Alternatively, the subset 18 may be a portable telephone linesman test set. The telephone subset 18 is designed to support voice services only, i.e., conventional telephone calls between and among subscribers. Usually additional equipment, such as a modem, not shown in FIG. 1, is required to support data communication based links. Ordinarily, such a modem would be required by the field service personnel for performing certain tests. The modem is not needed, however, if the field service personnel is able to use only non-data communications for both requesting services and receiving the results thereof.

A typical telephone network 14 includes means 22 for providing voice services and means 24 for providing maintenance services. The maintenance services are usually performed via a test trunk device located at the local switch of the telephone network 14. The typical test trunk device is provided in order to allow the maintenance and testing of subscriber lines in a non-ring fashion. In the preferred embodiment, the means 22 for providing voice services and the means 24 for providing maintenance services are in parallel. The means 22 for providing voice services includes such services as call setup i.e., dial tone digit collection, ringing and ringback, call completion, tear down and call link tear down upon detection of an on-hook condition at the subscriber location. The means 24 for providing maintenance services includes such services, measurements and/or tests applied to both switch and loop connections and typically involve some form of data communication protocol.

The service center 16 interconnects with the telephone network 14 via another network interface 26 that allows connection to the telephone network 14. The service center 16 includes, in the preferred embodiment, a modem 28, a voice subsystem 30, a maintenance subsystem 32, a programmed control subsystem 34, a terminal 36 and a secondary storage 38.

The modem 28 is provided for data communication functions. In applications where transmission conditions allow, a direct digital data link may be used without the need for a modem. The modem 28 is connected, on one side thereof, to the network interface 26 and, on the other side thereof, to the programmed control subsystem 34 and the maintenance subsystem 32. The programmed control subsystem 34 interprets requests and schedules and coordinates tests as well as the reporting of test results. The maintenance subsystem 32 communicates with, and controls, the actual network testing services. The voice subsystem 30, connected between the network interface 26 and the programmed control subsystem 34, primarily performs voice recognition, synthesis and voice telephony functions.

Preferably, the voice subsystem 30 includes a nonvocal signal receiver, such as a DTMF receiver, that decodes commands sent via a tone dialer. In the preferred embodiment, the terminal 36 includes a keyboard and monitor and the secondary storage 38 is connected thereto via the programmed control subsystem 34. The terminal 36 is provided for a human interface either for reprogramming the programmed control subsystem 34 or overriding information and commands stored within the programmed control subsystem 34. The secondary storage 38 is provided as a repository for programs and data necessary to execute the necessary maintenance services.

In the preferred embodiment, the service center 16 essentially consists of a personal computer, or the equivalent thereof, wherein the modem 28 and the voice subsystem 30 are included as typical plug-in boards and the terminal 36 and secondary storage 38 are preselected compatable peripheral components. Although the system initialization can be handled via a boot strapping program at power-on, the terminal 36 allows a local override of the system 10 by service center personnel.

The voice subsystem 30 preferably operates as a coprocessor within the computer, communicating therewith by means of a combination of interrupts, input-/outputs and shared memory. A single board voice-based system for use with a personal computer that can be readily adapted for use in the system 10 is described and discussed in U.S. patent application Ser. Nos. 659,989; 670,436; and 670,521 filed on Oct. 13, 1984, Nov. 9, 1984 and Nov. 9, 1984, respectively, and assigned to the assignee hereof. These applications are deemed incorporated herein by reference. In general, the voice subsystem 30 notifies the computer of voice events, such as, a voice utterance received, a DTMF code received, a voice utterance recognized, a DTMF recognized and the completion of a voice synthesized message.

The maintenance subsystem 32, in the preferred embodiment, is realized as a plurality of application programs or sub-programs within the personal computer and/or as separate system components accessible via a data communication link. Operationally, in one embodiment, the computer down-loads program and data to the voice subsystem 30 and provides control commands thereto.

Figure 2:
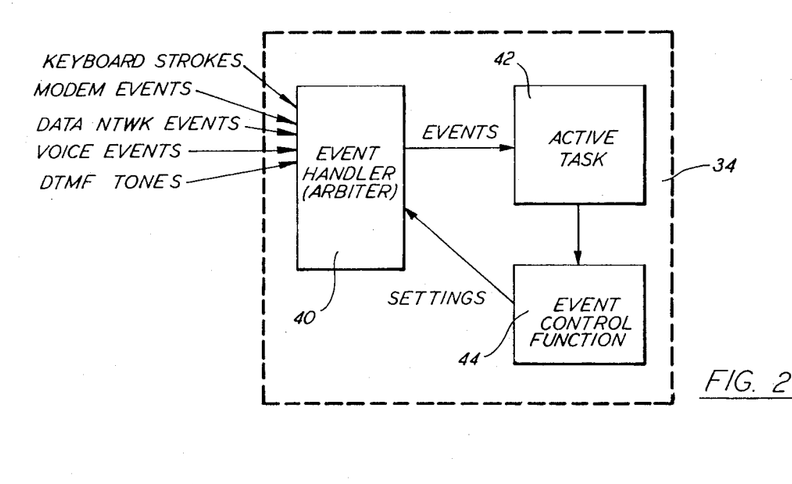
FIG. 2 is a block diagram of a program control subsystem adapted for use as shown in FIG. 1.

In one particular implementation of the present system 10 the programmed control subsystem 34 includes, as shown in FIG. 2, an event handler 40, i.e., an arbiter, an active task handler 42 and an event controller 44. The event handler 40 has, as inputs thereto, keyboard strokes from the terminal 36, all modem events, all data network events, voice events and DTMF tones. In general, as further shown in the flow charts, FIGS. 3-9, the event handler 40 can be set to either ignore or handle each event based on the event type indicated thereto and is adapted to provide an immediate response if necessary as well as routing each handled event to the active task handler 42.

The active task handler 42 executes a system function, such as, performing a remotely requested measurement or test. The active task handler 42 communicates with the event controller 44 function to allow the disregarding of all other inputs to the event handler 40 during a particular test. For example, it may be necessary to ignore all keyboard strokes and voice utterances for the duration of a voice synthesized output message.

Preferably, the event handler 40 is implemented by a set of event control functions within the event controller 44, or dispatcher, that control the ability of the event handler 40 to accept inputs. Typically, the event controller 44 is queried by the event handler 40 prior to taking action subsequent to the receipt of an input event indicator.

The flow charts shown in FIGS. 3 through 9 are discussed below. For purposes of this discussion, the notation used in FIGS. 3 through 9 is as follows:

(a) a solid line indicates the flow path within a particular part of the system 10;
(b) a dashed line indicates the flow path between parts of the system 10;
(c) notation in parenthesis indicates the part state or setting;
(d) notation in rectangles indicate part actions; and
(e) notation in ovals indicate control transfer destination.

Figure 3:
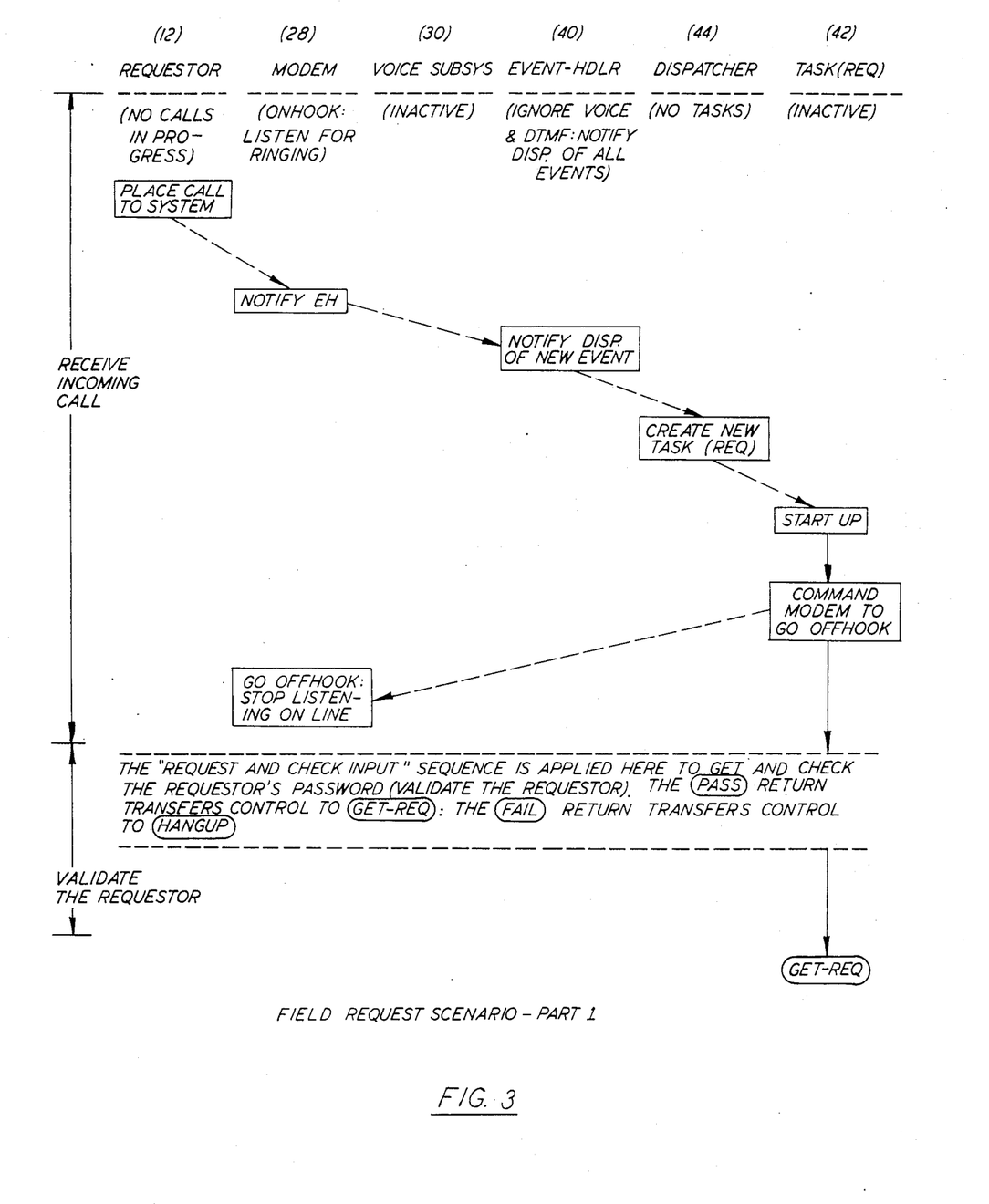
FIGS. 3-9 are flow diagrams depicting different scenerios of the system shown in FIG. 1.
Figure 4:
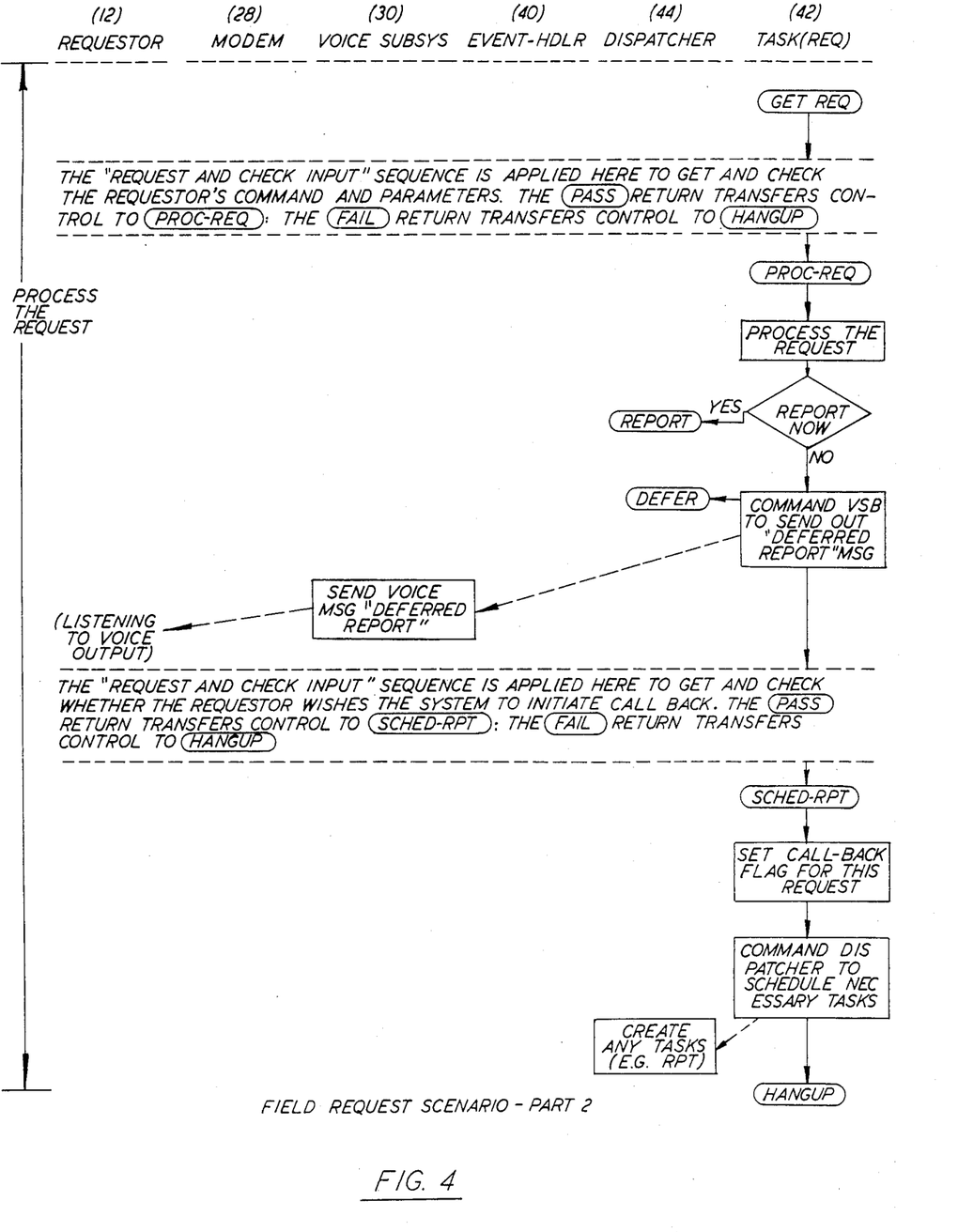

In one preferred implementation, a call is placed to the service center 16 by a remotely located field service personnel via the means 12 and is initially handled as shown in FIG. 3. In particular, when the call is placed, the modem 28, being "ON HOOK" and awaiting any call, detects the ringing and notifies the event handler 40 that notifies the dispatcher 44 of the incoming call. The dispatcher 44 creates a new active task, designated hereinafter as REQ. The REQ task then sets the event handler 40 to ignore further utterances and/or DTMF tonal inputs. Simulataneously, the modem 28 is commanded to go OFF HOOK, i.e., to stop monitoring the line. In the preferred scenerio the REQ task also activates a requestor validation scenario.

Figure 6:
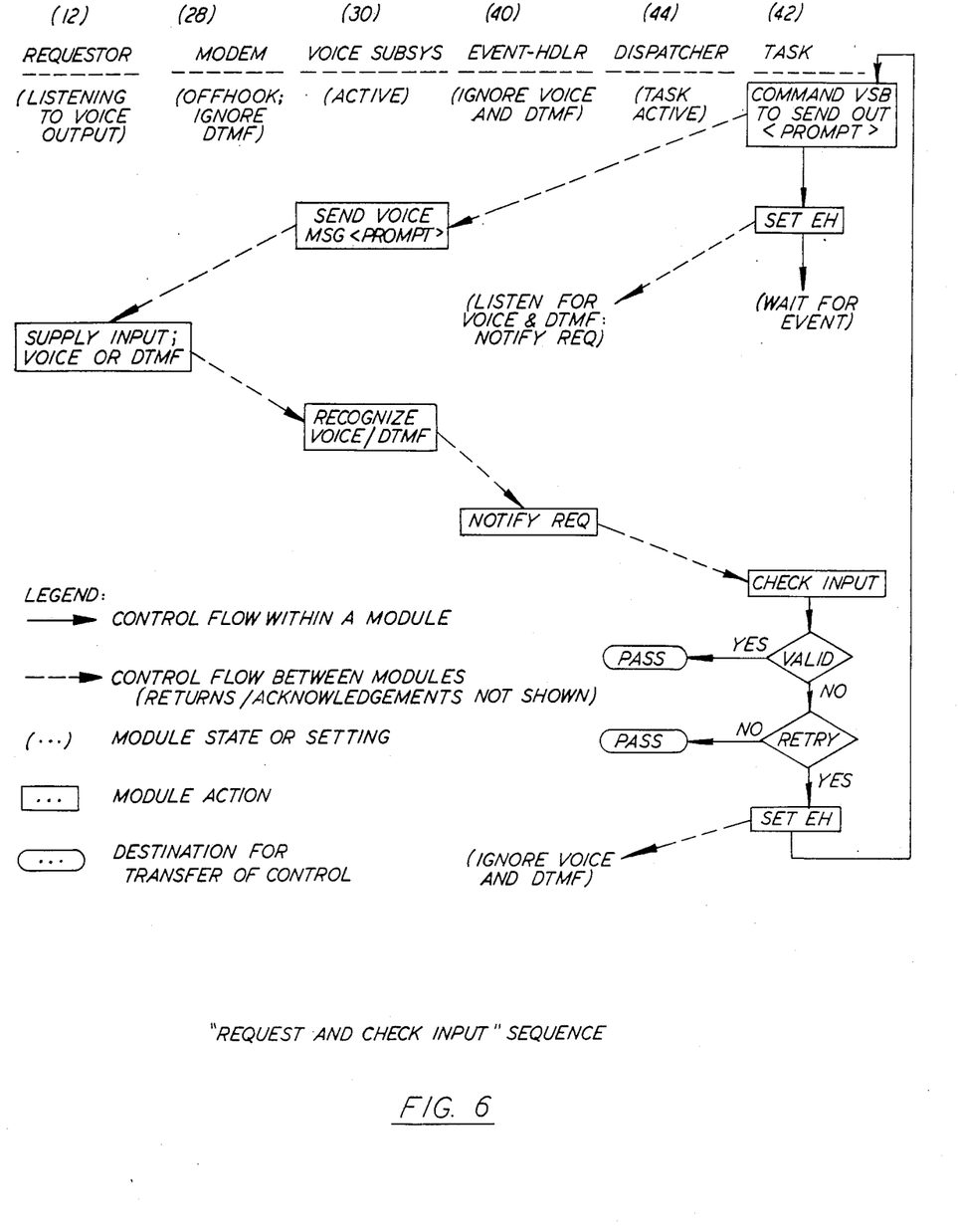

A typical requestor validation scenario is depicted in FIG. 6. As shown, the voice subsystem 30 is activated to send a voice prompt message to the requestor. For example, the voice subsystem 30 may request that a password be inputted. The event handler 40 is then set to listen for either a voice or DTMF response from the requestor. Responsive utterances or DTMF tonal signals are detected and recognized by the voice subsystem 30 and forwarded to REQ by the event handler 40 for validation. If the password is validated, control is passed to the REQ task in the active task indicator 42. If the password is invalid, REQ may be set to allow a retry by the requestor or proceed to terminate the call and return to the monitoring state. Of course, any number of retries may be allowed although more than a few retries would invite tampering.

Once the caller is validated, the request is processed. One preferred request processing scenario is depicted by the flow chart shown in FIG. 4. The requestor is voice prompted to enter his request and, as shown, the validation scenario shown in FIG. 6 is applied to both obtain and verify the commands and parameters inputted by the requestor. Upon validation the active task handler 42 processes the requested service and either immediately reports the results or defers the report. If the report is deferred, for example, if the requested test consumes more than a reasonably short time or if the service request is placed in queue, a voice prompt so notifies the requestor. Under these circumstances, the requestor is given the opportunity to decide if the deferred report will be provided at the requestor's initiative or if the system will initiate the report call. In either case the active task handler 42 schedules the call back and directs the dispatcher 44 to create a reporting (RPT) task. The active task handler 42 then initiates a hangup scenario.

Figure 5:
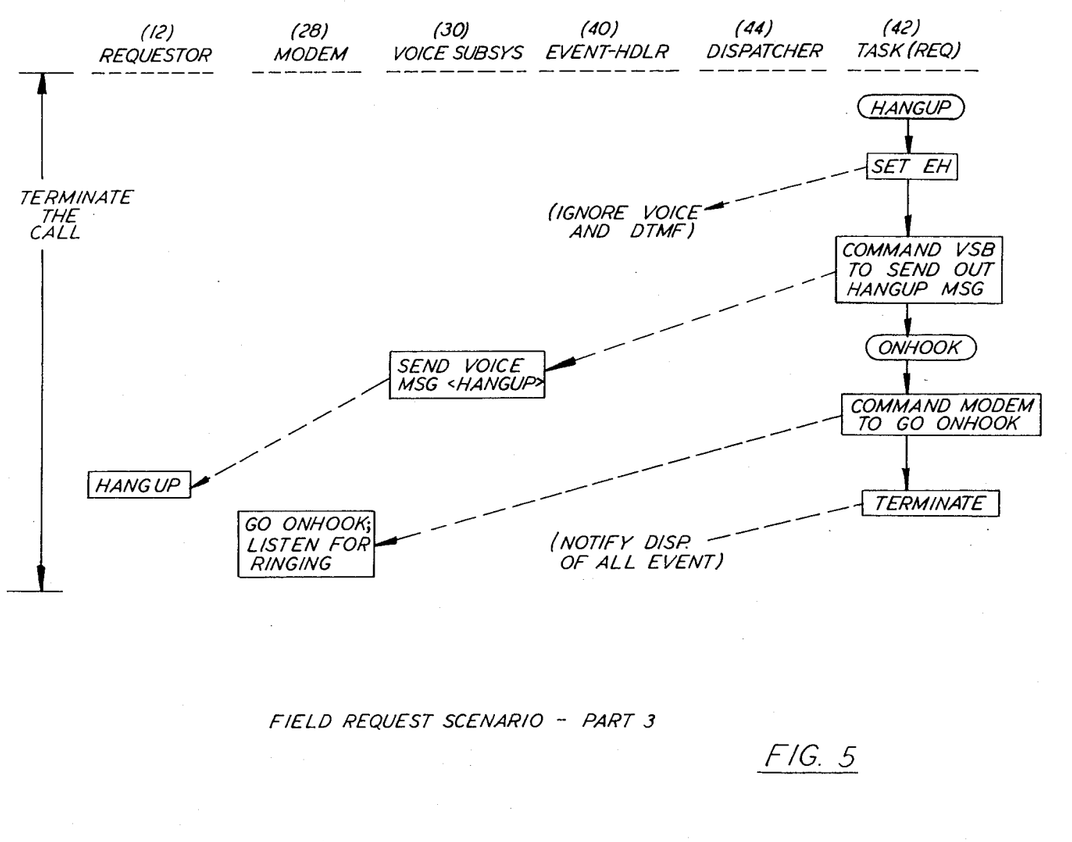

The hangup scenario, shown in the flow diagram of FIG. 5, proceeds to terminate the requestor's call. The event handler 44 is set to ignore all voice and DTMF inputs. The voice subsystem 30 then transmits a voice message advising the requestor to hang up. The active task handler 42 then directs the modem 28 to go ON HOOK in preparation for the next request.

Figure 7:
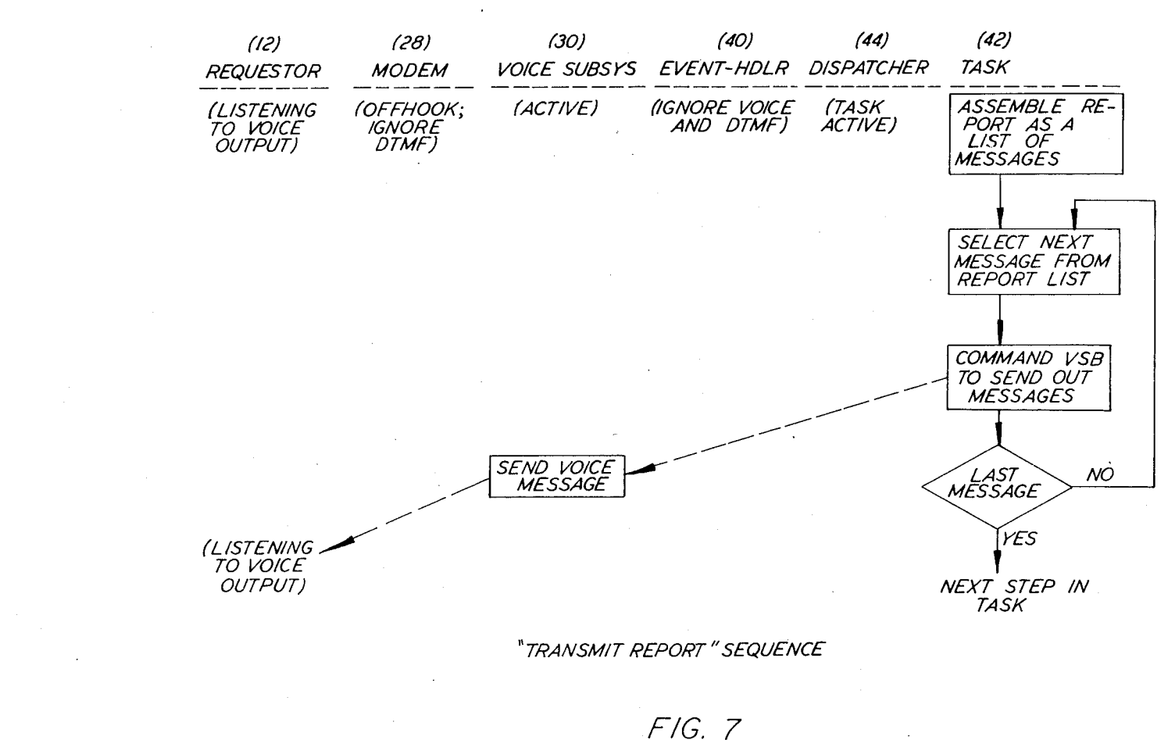
Figure 8:
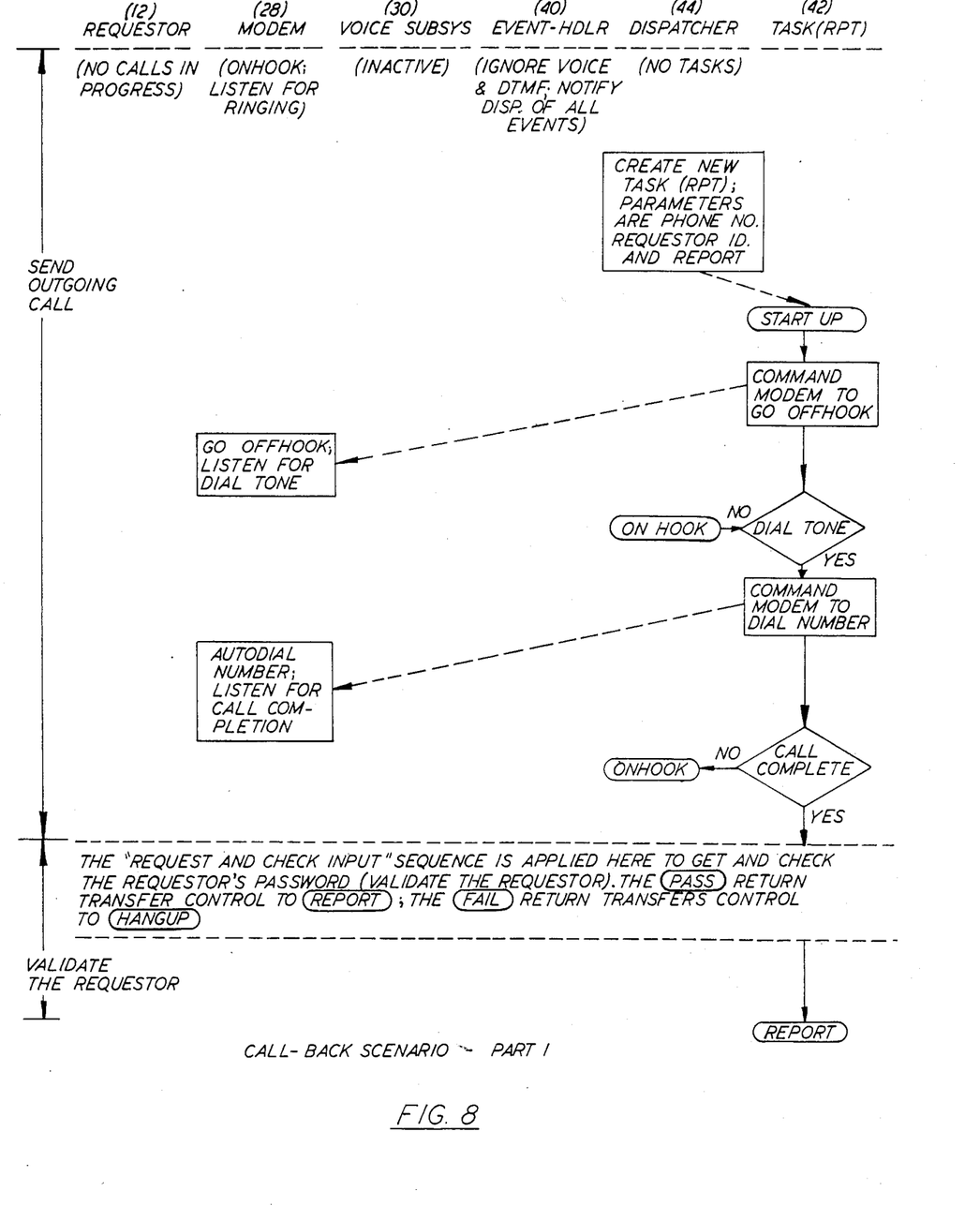
Figure 9:
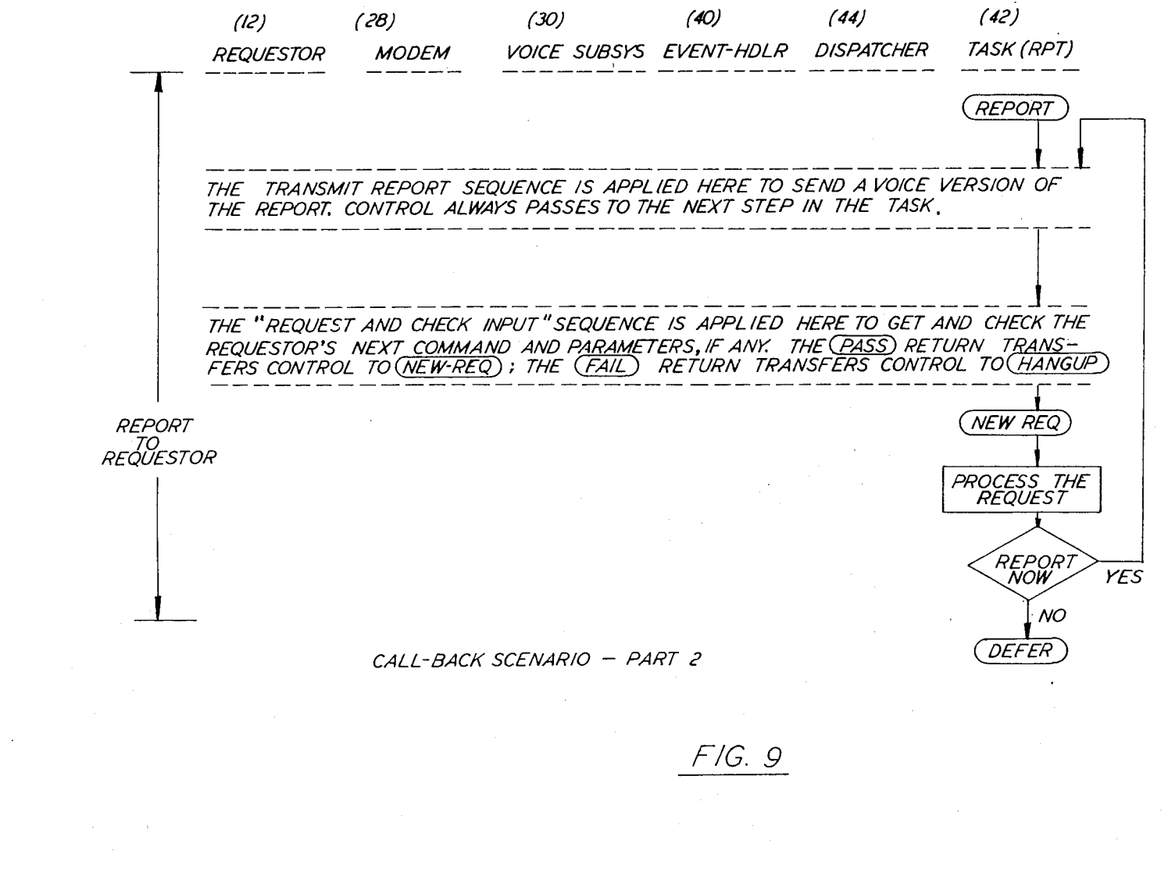

A report is transmitted, as shown in the flow diagram of FIG. 7, by the active task handler 42 by forming a list of messages and sequentially forwarding each to the requestor via the voice subsystem 30. If the system 10 is to initiate a deferred report the task RPT sets up the return call as shown in the flow diagram shown in FIG. 8. As shown therein, upon call completion the identity of the requestor is verified via the validity scenario shown in FIG. 6. Once the requestor is validated the report is transmitted via the "Transmit Report" scenario of FIG. 7, as shown in the flow diagram of FIG. 9. After the report has been transmitted the requestor may provide new commands and parameters for further service. As before, these are validated using the validation scenario shown in FIG. 6.

Advantageously, each scenerio is directly analogous to a terminal session with a typical remote maintenance service center wherein the usual "logon" and "logoff" are analogous to the call receive and hang-up functions of the system 10. Hence, the system 10 for providing remote maintenance and services is not disruptive of the structure or functionality of presently existing systems. Further, the system 10 extends the direct usefulness of presently existing systems to field personnel and applications without requiring extraordinary education and other complex instructions and equipment to, and by, field personnel.

Although the present system has been described herein with regard to an exemplary embodiment it will be understood that other arrangements and configurations may also be used that nevertheless do not depart from the spirit and scope of the present invention. Hence, the present invention is deemed limited only by the appended claims and the reasonable interpretation thereof.

What is claimed is:

1. A system for providing remote services, said system comprises:
   a service center, said service center being responsive to remote requests received via a telecommunication network, said service center including means for automatically vocally responding to the requestor providing said remote requests
   a voice-based subsystem, said voice-based subsystem including said vocally responding means, means for receiving vocalized commands from said requestor, and means for receiving dual tone multifrequency tonal signals;
   a controller, said controller being preprogrammed to respond to inputs from said voice-based subsystem and to command said voice-based subsystem to provide said vocalized responses; and
   a modem, said modem bidirectionally communicating with controller.

2. System as claimed in claim 1 further comprising:
   means for performing a plurality of services on a subscriber line selected by said requestor.

3. System as claimed in claim 1 wherein said vocal responding means further comprises:
   means for receiving vocalized commands from said requestor.

4. System as claimed in claim 3 wherein said vocal responding means further comprises:
   means for receiving dual tone multifrequency tonal signals.

5. System as claimed in claim 1 further comprising:
   means for performing a plurality of maintenance services on a subscriber line selected by said requestor, said maintenance services performing means communicating with said controller and said modem.

6. System as claimed in claim 1 further comprising:
   means for externally accessing said controller.

7. System as claimed in claim 1 further comprising:
   means for storing a plurality of programs, said program storing means being accessible to said controller.

8. System as claimed in claim 1 wherein said controller comprises:
   an event handler, said event handler being adapted to receive all inputs to said controller;

an active task handler, said active task handler being adapted to execute said remote requests; and an event controller, said event controller controlling the accessibility of said event handler to said inputs thereto.

9. A system for providing remote services, said system comprises:

means for automatically performing a plurality of services on a subscriber line of a telephone network;

means for selecting a particular one of said services, said selection means being responsive to an input signal from a requestor via a subscriber line;

means for vocally reporting the results of said selected service to said requestor via said subscriber line; and means for validating said requestor.

10. System as claimed in claim 9 further comprising:
means for terminating a call from said requestor when said requestor is invalidated.

11. System as claimed in claim 10 further comprising:
means for providing vocalized prompts to said requestor.

12. System as claimed in claim 11 further comprising: means, responsive to an input from said requestor, for deferring said vocally reporting said results.

13. A method for providing remote services; said method comprising the steps of:

receiving vocal commands and parameters defining one or more services from a call via a remote service requestor;

validating said commands and parameters;

automatically executing said services; and vocally reporting the results of said executed services.

14. Method as claimed in claim 13 further comprising the step of:

validating the identity of said requestor prior to receiving vocal requesting commands and parameters.

15. Method as claimed in claim 14 further comprising the step of:

automatically terminating said call subsequent to vocally reporting of said results.

16. Method as claimed in claim 15 further comprising the step of:

vocally prompting said requestor to request either a deferred vocal reporting or an immediate vocal report.

* * * * *